(12) United States Patent
Trainer et al.

(10) Patent No.: US 9,479,061 B2
(45) Date of Patent: Oct. 25, 2016

(54) DC TO DC CONVERTER ASSEMBLY

(75) Inventors: David Reginald Trainer, Alvaston (GB); Nnamdi Okaeme, London (GB)

(73) Assignee: Alstom Technology Ltd., Baden (CH)

( * ) Notice: Subject to any disclaimer, the term of this patent is extended or adjusted under 35 U.S.C. 154(b) by 12 days.

(21) Appl. No.: 14/236,628

(22) PCT Filed: Aug. 24, 2011

(86) PCT No.: PCT/EP2011/064545
§ 371 (c)(1),
(2), (4) Date: Apr. 28, 2014

(87) PCT Pub. No.: WO2013/017177
PCT Pub. Date: Feb. 7, 2013

(65) Prior Publication Data
US 2014/0254205 A1     Sep. 11, 2014

(30) Foreign Application Priority Data

Aug. 1, 2011   (WO) .................. PCT/EP2011/063207

(51) Int. Cl.
*H02M 7/483*   (2007.01)
*H02M 3/335*   (2006.01)
*H02M 3/28*    (2006.01)

(52) U.S. Cl.
CPC .............. *H02M 3/28* (2013.01); *H02M 3/335* (2013.01); *H02M 3/33576* (2013.01); *H02M 7/483* (2013.01); *H02M 2007/4835* (2013.01)

(58) Field of Classification Search
CPC ............ H02J 3/36; H02M 7/42; H02M 7/44; H02M 7/48; H02M 7/483; H02M 7/49; H02M 7/5387; H02M 7/7575; H02M 7/797; H02M 2007/4835
USPC ................. 363/15–17, 34, 35, 37–43, 50–55, 363/56.01–56.05, 57–58, 84–89, 95–98, 363/123, 125, 127, 131–132, 135–138
See application file for complete search history.

(56) References Cited

U.S. PATENT DOCUMENTS 3,857,083 A   12/1974   Lundstrom
3,867,643 A    2/1975   Baker et al.
(Continued)

FOREIGN PATENT DOCUMENTS

CN   101 795 072 A    8/2010
DE   43 17 965       12/1994
(Continued)

OTHER PUBLICATIONS

Office Action in U.S. Appl. No. 13/388,277, mailed on Mar. 18, 2015.
(Continued)

*Primary Examiner* — Timothy J Dole
*Assistant Examiner* — Ivan Laboy Andino
(74) *Attorney, Agent, or Firm* — Nixon Peabody LLP; Khaled Shami (57) ABSTRACT

A DC-to-DC converter assembly includes an inverter having first and second terminals connectable to a power transmission network. The inverter has a modular multilevel converter including a first inverter limb extending between the first and second terminals with first and second inverter limb portions separated by a third terminal. Each inverter limb portion includes at least one rationalized module having first and second sets of series-connected current flow control elements connected in parallel with an energy storage device. The current flow control elements include an active switching element directing current through the energy storage device and a passive current check element limiting current flow to one direction. The current flow control elements and energy storage device provide a voltage source to synthesize an AC voltage at the third terminal. A rectifier is electrically connected to the third terminal and connectable to a second power transmission network.

8 Claims, 10 Drawing Sheets

(56) References Cited

U.S. PATENT DOCUMENTS

| | | | |
|---|---|---|---|
| 4,053,820 A | 10/1977 | Peterson et al. | |
| 4,300,181 A | 11/1981 | Premerlani | |
| 4,636,907 A | 1/1987 | Howell | |
| 4,658,227 A | 4/1987 | Howell et al. | |
| 4,663,702 A | 5/1987 | Tanaka | |
| 4,816,736 A | 3/1989 | Dougherty et al. | |
| 5,027,264 A | 6/1991 | DeDoncker et al. | |
| 5,093,583 A | 3/1992 | Mashino et al. | |
| 5,164,872 A | 11/1992 | Howell | |
| 5,339,210 A | 8/1994 | Howell | |
| 5,345,375 A | 9/1994 | Mohan | |
| 5,499,178 A | 3/1996 | Mohan | |
| 5,515,264 A | 5/1996 | Stacey | |
| 5,532,575 A | 7/1996 | Ainsworth et al. | |
| 5,561,595 A | 10/1996 | Smith | |
| 5,644,482 A | 7/1997 | Asplund | |
| 5,673,189 A | 9/1997 | Schettler | |
| 5,719,486 A | 2/1998 | Taniguchi et al. | |
| 5,726,557 A | 3/1998 | Umeda et al. | |
| 5,870,293 A | 2/1999 | Svensson et al. | |
| 5,889,667 A | 3/1999 | Bernet | |
| 5,892,677 A | 4/1999 | Chang | |
| 5,936,855 A | 8/1999 | Salmon | |
| 5,999,422 A | 12/1999 | Goransson et al. | |
| 6,134,126 A | 10/2000 | Ikekame et al. | |
| 6,137,704 A | 10/2000 | Ito et al. | |
| 6,236,580 B1 | 5/2001 | Aiello et al. | |
| 6,301,130 B1 | 10/2001 | Aiello et al. | |
| 6,320,767 B1 | 11/2001 | Shimoura et al. | |
| 6,392,348 B1 | 5/2002 | Dougherty | |
| 6,603,675 B1 | 8/2003 | Norrga | |
| 6,879,062 B2 | 4/2005 | Oates | |
| 6,987,680 B2 | 1/2006 | Vire et al. | |
| 7,050,311 B2 | 5/2006 | Lai et al. | |
| 7,170,767 B2 | 1/2007 | Bixel | |
| 7,199,535 B2 | 4/2007 | Welchko et al. | |
| 7,274,576 B1 | 9/2007 | Zargari et al. | |
| 7,292,462 B2 | 11/2007 | Watanabe et al. | |
| 7,298,115 B2 | 11/2007 | Nishimura et al. | |
| 7,499,291 B2 | 3/2009 | Han | |
| 7,622,825 B2 | 11/2009 | Brune et al. | |
| 7,729,144 B2 | 6/2010 | Urakabe et al. | |
| 8,188,720 B2 | 5/2012 | Kim et al. | |
| 8,294,408 B2 | 10/2012 | Matt et al. | |
| 8,390,259 B2 | 3/2013 | Dommaschk et al. | |
| 8,599,591 B2 | 12/2013 | Crookes et al. | |
| 8,848,401 B2 | 9/2014 | Green et al. | |
| 8,854,843 B2 | 10/2014 | Trainer et al. | |
| 8,861,231 B2 | 10/2014 | Cross et al. | |
| 8,861,234 B2 | 10/2014 | Trainer et al. | |
| 8,867,242 B2 | 10/2014 | Clare et al. | |
| 8,867,244 B2 | 10/2014 | Trainer et al. | |
| 8,891,209 B2 | 11/2014 | Howell et al. | |
| 8,934,268 B2 | 1/2015 | Trainer et al. | |
| 9,065,299 B2 | 6/2015 | Trainer et al. | |
| 9,130,458 B2 | 9/2015 | Crookes et al. | |
| 9,209,693 B2 | 12/2015 | Davidson et al. | |
| 2002/0060497 A1 | 5/2002 | Arita et al. | |
| 2002/0149953 A1 | 10/2002 | Smedley et al. | |
| 2002/0176265 A1 | 11/2002 | Oates | |
| 2003/0202367 A1 | 10/2003 | Schreiber | |
| 2004/0218318 A1 | 11/2004 | Bijlenga et al. | |
| 2005/0127853 A1 | 6/2005 | Su | |
| 2005/0135126 A1 | 6/2005 | Gazel et al. | |
| 2005/0146226 A1 | 7/2005 | Trainer et al. | |
| 2008/0002443 A1 | 1/2008 | Ueda et al. | |
| 2008/0007978 A1 | 1/2008 | Han | |
| 2008/0137383 A1 | 6/2008 | Chang et al. | |
| 2008/0179951 A1 | 7/2008 | Brune et al. | |
| 2008/0205093 A1 | 8/2008 | Davies et al. | |
| 2008/0258661 A1 | 10/2008 | Nagashima et al. | |
| 2008/0310205 A1 | 12/2008 | Hiller | |
| 2009/0021966 A1 | 1/2009 | Jacobson et al. | |
| 2009/0027934 A1 | 1/2009 | Bustos | |
| 2009/0033254 A1 | 2/2009 | Nagashima et al. | |
| 2009/0085548 A1 | 4/2009 | Suh et al. | |
| 2009/0102436 A1 | 4/2009 | Valderrama et al. | |
| 2009/0116268 A1 | 5/2009 | Kishida et al. | |
| 2009/0206781 A1 | 8/2009 | Itoh et al. | |
| 2010/0067266 A1 | 3/2010 | Dommaschk et al. | |
| 2010/0118578 A1 | 5/2010 | Dommaschk et al. | |
| 2010/0309698 A1 | 12/2010 | Asplund et al. | |
| 2011/0018481 A1 | 1/2011 | Hiller | |
| 2011/0044077 A1 | 2/2011 | Nielsen | |
| 2011/0149622 A1 | 6/2011 | Lin | |
| 2011/0205768 A1 | 8/2011 | Svensson | |
| 2011/0260701 A1 | 10/2011 | Horger et al. | |
| 2011/0280049 A1 | 11/2011 | Mori et al. | |
| 2012/0026767 A1 | 2/2012 | Inoue et al. | |
| 2012/0063185 A1 | 3/2012 | Janning | |
| 2012/0069610 A1 | 3/2012 | Trainer et al. | |
| 2012/0120697 A1 | 5/2012 | Cuk | |
| 2012/0127766 A1 | 5/2012 | Crookes et al. | |
| 2012/0170338 A1 | 7/2012 | Trainer et al. | |
| 2012/0182771 A1 | 7/2012 | Trainer et al. | |
| 2012/0188803 A1 | 7/2012 | Trainer et al. | |
| 2012/0195084 A1 | 8/2012 | Norrga | |
| 2012/0234796 A1 | 9/2012 | Juhlin | |
| 2013/0020881 A1 | 1/2013 | Panousis et al. | |
| 2013/0026841 A1 | 1/2013 | Hosini et al. | |
| 2013/0051105 A1 | 2/2013 | Wang et al. | |
| 2013/0094264 A1 | 4/2013 | Crookes et al. | |
| 2013/0099572 A1 | 4/2013 | Norrga | |
| 2013/0119970 A1 | 5/2013 | Trainer et al. | |
| 2013/0128629 A1 | 5/2013 | Clare et al. | |
| 2013/0128636 A1 | 5/2013 | Trainer et al. | |
| 2013/0182467 A1 | 7/2013 | Cross et al. | |
| 2013/0194838 A1 | 8/2013 | Jang et al. | |
| 2013/0208514 A1 | 8/2013 | Trainer et al. | |
| 2013/0208521 A1 | 8/2013 | Trainer et al. | |
| 2013/0279211 A1 | 10/2013 | Green et al. | |
| 2014/0098575 A1 | 4/2014 | Whitehouse | |
| 2014/0133196 A1 | 5/2014 | Trainer | |
| 2014/0146583 A1 | 5/2014 | Trainer et al. | |
| 2014/0254205 A1 | 9/2014 | Trainer et al. | |
| 2014/0293656 A1* | 10/2014 | Trainer et al. | 363/15 |
| 2014/0293668 A1 | 10/2014 | Trainer et al. | |
| 2014/0313797 A1 | 10/2014 | Davidson et al. | |
| 2015/0009594 A1 | 1/2015 | Okaeme et al. | |
| 2015/0116881 A1 | 4/2015 | Burnett et al. | |
| 2015/0131189 A1 | 5/2015 | Davidson et al. | |

FOREIGN PATENT DOCUMENTS

| | | |
|---|---|---|
| DE | 195 35 552 | 4/1996 |
| DE | 101 03 031 | 7/2002 |
| DE | 10 2005 040 432 | 3/2007 |
| DE | 10 2007 003172 | 2/2008 |
| DE | 10 2008 045247 | 3/2008 |
| DE | 10 2008 014 898 | 9/2009 |
| DE | 102010 007 452 | 8/2011 |
| EP | 0 867 998 B1 | 3/2007 |
| EP | 1 800 391 A2 | 6/2007 |
| GB | 2 294 821 A | 5/1996 |
| GB | 2 375 902 A | 11/2002 |
| GB | 2 418 079 A | 3/2006 |
| JP | 2008-125310 A | 5/2008 |
| WO | WO 97/02639 | 1/1997 |
| WO | WO 02/50972 | 6/2002 |
| WO | WO 02/063758 | 8/2002 |
| WO | WO 03/055048 | 7/2003 |
| WO | 2007/033852 | 3/2007 |
| WO | WO 2007/023061 A2 | 3/2007 |
| WO | WO 2007/028349 | 3/2007 |
| WO | WO 2007/028350 | 3/2007 |
| WO | WO 2008/024038 | 2/2008 |
| WO | WO 2008/086760 | 7/2008 |
| WO | WO 2009/149743 | 12/2009 |
| WO | WO 2010/025758 | 3/2010 |
| WO | WO 2010/040388 | 4/2010 |
| WO | WO 2010/069371 | 6/2010 |
| WO | WO 2010/088969 | 8/2010 |
| WO | WO 2010/112523 | 10/2010 |
| WO | WO 2010/145688 | 12/2010 |

(56) References Cited

FOREIGN PATENT DOCUMENTS

| | | |
|---|---|---|
| WO | WO 2010/145689 | 12/2010 |
| WO | WO 2010/145690 | 12/2010 |
| WO | WO 2010/149200 | 12/2010 |
| WO | WO 2011/012171 | 2/2011 |
| WO | WO 2011/012174 | 2/2011 |
| WO | WO 2011/015227 | 2/2011 |
| WO | WO 2011/029480 | 3/2011 |
| WO | WO 2011/044928 | 4/2011 |
| WO | 2011/050832 A1 | 5/2011 |
| WO | WO 2011/050847 | 5/2011 |
| WO | WO 2011/098117 | 8/2011 |
| WO | WO 2011/113471 | 9/2011 |
| WO | WO 2011116816 A1 * | 9/2011 ............ H02M 7/757 |
| WO | WO 2011/124258 | 10/2011 |
| WO | WO 2011/127980 | 10/2011 |
| WO | WO 2011/141054 | 11/2011 |
| WO | WO 2011/157300 | 12/2011 |
| WO | WO 2012007040 A1 * | 1/2012 ............ H02M 3/335 |
| WO | WO 2012/013248 | 2/2012 |
| WO | WO 2012/025142 | 3/2012 |
| WO | WO 2012/167826 | 12/2012 |
| WO | WO 2013/000510 | 1/2013 |
| WO | WO 2013/071975 | 5/2013 |
| WO | WO 2013/017160 | 7/2013 |
| WO | WO 2013/017177 | 7/2013 |
| WO | WO 2013/127461 | 9/2013 |
| WO | WO 2013/127462 | 9/2013 |
| WO | WO 2013/127463 | 9/2013 |

OTHER PUBLICATIONS

Notice of Allowance in U.S. Appl. No. 13/634,205, mailed on Apr. 27, 2015.

Office Action in U.S. Appl. No. 14/129,923, mailed on Feb. 17, 2015.

Office Action in U.S. Appl. No. 14/359,088, mailed on Apr. 7, 2015.

Allebrod, S. et al., "New Transformerless, Scalable Modular Multilevel Converters for HVDC—Transmission", Power Electronics Specialists Conference, IEEE, Jun. 15, 2008, pp. 174-179.

Baran, M. E. et al., "Overcurrent Protection in DC Zonal Shipboard Power Systems using Solid State Protection Devices", Electric Ship Technologies Symposium, 2007, ESTS '07, IEEE, IEEE, PI, May 1, 2007, pp. 221-224.

Ertl, H et al., "A Constant Output Current Three-Phase Diode Bridge Rectifier Employing a Novel Electronic Smoothing Inductor", IEEE Transactions on Industrial Electronics,vol. 52, Issue 2, Apr. 1, 2005, pp. 454-461.

Glinka, M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.

Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, pp. 1-8.

Hagiwara, Makoto et al., "PWM Control and Experiment of Modular Multilevel Converters", Power Electronics Specialists Conference (PESC), Rhodes, Jun. 15-19, 2008, IEEE, pp. 154-161.

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Lesnicar, A. et al., "A New Modular Voltage Source Inverter Topology", European Power Electronics Conference (EPE), Toulouse, France, Sep. 2-4, 2003, 10 pages.

Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Qahraman, B. et al., "A VSC Based Series Hybrid Converter for HVDC Transmission", Canadian Conference Electrical and Computer Engineering Conference, 2005, CCECE/CCGEI, Saskatoon, May 1-4, 2005, pp. 458-461.

Raju, N.R., "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4, pp. 2181-2185.

Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE, vol. 2, pp. 829-834.

Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

PCT International Search Report and Written Opinion for Application No. PCT/EP2009/057388, mailed on Mar. 18, 2010.

PCT International Preliminary Report on Patentability in International Application No. PCT/EP2009/057388, mailed on Dec. 14, 2011.

PCT International Search Report and Written Opinion in International Application No. PCT/EP2009/057736, mailed on Mar. 26, 2010.

PCT International Preliminary Report on Patentability in International Application No. PCT/EP2009/057736, mailed on Nov. 24, 2011.

PCT International Search Report and Written Opinion in International Application No. PCT/EP2009/059973, mailed on Aug. 13, 2010.

PCT International Preliminary Report on Patentability in International Application No. PCT/EP2009/059973, mailed on Oct. 5, 2011.

PCT International Search Report and Written Opinion in International Application No. PCT/EP2010/051572, mailed on Jan. 19, 2011.

PCT International Preliminary Report on Patentability in International Application No. PCT/EP2010/051572, mailed on Apr. 20, 2012.

PCT International Search Report and Written Opinion in International Application No. PCT/EP2010/053290, mailed on Feb. 11, 2011.

PCT International Preliminary Report on Patentability in International Application No. PCT/EP2010/053290, mailed on Apr. 20, 2012.

PCT International Search Report and Written Opinion in International Application No. PCT/EP2010/054660, mailed on Feb. 24, 2011.

PCT International Preliminary Report on Patentability in International Application No. PCT/EP2010/054660, mailed on Jun. 6, 2012.

PCT International Search Report for International Application No. PCT/EP2010/054974, mailed on Mar. 4, 2011.

(56) References Cited

OTHER PUBLICATIONS

PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report in International Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP10/62316, mailed on Jul. 6, 2011.
PCT International Preliminary Report on Patentability in International Application No. PCT/EP10/62316, mailed on Mar. 7, 2013.
PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
PCT International Search Report and Written Opinion in International Application No. PCT/EP2011/063207, mailed May 30, 2012.
PCT International Preliminary Report on Patentability in International Application No. PCT/EP2011/063207, mailed on Apr. 2, 2014.
PCT International Preliminary Report on Patentability in International Application No. PCT/EP2011/064545, mailed May 19, 2014.
PCT International Search Report and Written Opinion in International Application No. PCT/EP2011/070402, mailed on Sep. 27, 2012.
PCT International Preliminary Report on Patentability in International Application No. PCT/EP2011/070402, mailed on Feb. 18, 2014.
PCT International Search Report and Written Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP2012/053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP2012/053573, mailed on Dec. 4, 2012.
PCT International Preliminary Report on Patentability in International Application No. PCT/EP2012/053573, mailed on Jul. 21, 2014.
First Chinese Office Action in Application No. 200980160700.4, mailed Jun. 25, 2014.
Notice of Allowance in U.S. Appl. No. 13/378,336, mailed on Feb. 6, 2014.
Notice of Allowance in U.S. Appl. No. 13/378,336, mailed on Jun. 13, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Office Action in U.S. Appl. No. 13/388,277, mailed on Nov. 22, 2013.
Office Action in U.S. Appl. No. 13/388,277, mailed on Jul. 3, 2014.
Notice of Allowance in U.S. Appl. No. 13/576,920, mailed on Dec. 4, 2013.
Notice of Allowance in U.S. Appl. No. 13/576,920, mailed on Mar. 20, 2014.
Notice of Allowance in U.S. Appl. No. 13/576,920, mailed on Jun. 9, 2014.
Office Action in U.S. Appl. No. 13/634,205, mailed on Sep. 22, 2014.
Office Action in U.S. Appl. No. 13/639,844, mailed on May 22, 2014.
Notice of Allowance in U.S. Appl. No. 13/639,844, mailed on Sep. 8, 2014.
Notice of Allowance in U.S. Appl. No. 13/640,468, mailed on Jun. 4, 2014.
Notice of Allowance in U.S. Appl. No. 13/805,333, mailed on Feb. 2, 2015.
Notice of Allowance in U.S. Appl. No. 13/813,414, mailed on Jun. 2, 2014.
Notice of Allowance in U.S. Appl. No. 13/818,654, mailed on May 30, 2014.
U.S. Appl. No. 14/379,746, filed Aug. 28, 2014.
U.S. Appl. No. 14/381,570, filed Aug. 27, 2014.
U.S. Appl. No. 14/357,908, filed May 13, 2014.
Davidson, C.C et al., "Innovative Concepts for Hybrid Multi-Level Converters for HVDC Power Transmission", 9th IET International Conference on AC and DC Power Transmission, ACDC 2010, 5 pages, Oct. 19-21, 2010.
Flourentzou, Nikolas et al., "VSC-Based HVDC Power Transmission Systems: An Overview", IEEE Transactions on Power Electronics, vol. 24, No. 3, pp. 592-602, Mar. 2009.
Merlin, M.M.C. et al. "A New Hybrid Multi-Level Voltage-Source Converter With DC Fault Blocking Capability", 9th IET International Conference on AC and DC Power Transmission, ACDC 2010, 5 pages, Oct. 19-21, 2010.
International Search Report and Written Opinion in International Application No. PCT/EP2011/064545, mailed Jun. 11, 2012.
Office Action, dated Sep. 1, 2015, issued in U.S. Appl. No. 14/377,824.
Final Office Action, dated Sep. 18, 2015, issued in U.S. Appl. No. 14/129,923.
Office Action, dated Oct. 7, 2015, issued in U.S. Appl. No. 13/388,277.
Notice of Allowance for U.S. Appl. No. 14/356,882, mailed Jul. 20, 2015.
Office Action, dated Aug. 28, 2015, issued in U.S. Appl. No. 14/124,704.
Office Action for U.S. Appl. No. 14/236,627, mailed Aug. 4, 2015.
Final Office Action, dated Dec. 7, 2015, issued in U.S. Appl. No. 14/236,627, 21 pages.
Examiner-Initiated Interview Summary, dated Jan. 5, 2016, issued in U.S. Appl. No. 14/359,088, 2 pages.
Office Action, dated Mar. 16, 2016, issued in U.S. Appl. No. 14/381,570, 32 pages.
Office Action, dated Mar. 23, 2016, issued in U.S. Appl. No. 14/379,746, 31 pages.

\* cited by examiner

FIGURE 1

(PRIOR ART)

DC TO DC CONVERTER ASSEMBLY

CROSS REFERENCE TO RELATED APPLICATIONS

This application is the national stage of International Application No. PCT/EP2011/064545, filed Aug. 24, 2011, entitled, "A DC to DC Converter Assembly," which claims the benefit of priority of International Patent Application No. PCT/EP2011/063207, filed Aug. 1, 2011, the contents of which are incorporated herein by reference in their entirety.

This invention relates to a DC to DC converter assembly, and in particular a DC to DC converter assembly for connecting first and second high voltage DC power transmission networks.

BACKGROUND

1. Field of the Invention

With the increasing prevalence of renewable energy generators, such as off-shore wind, there is a growing need to transmit direct current (DC) electrical power from one high voltage DC power transmission network to another high voltage DC power transmission network.

2. Description of Related Art

Figure 1:
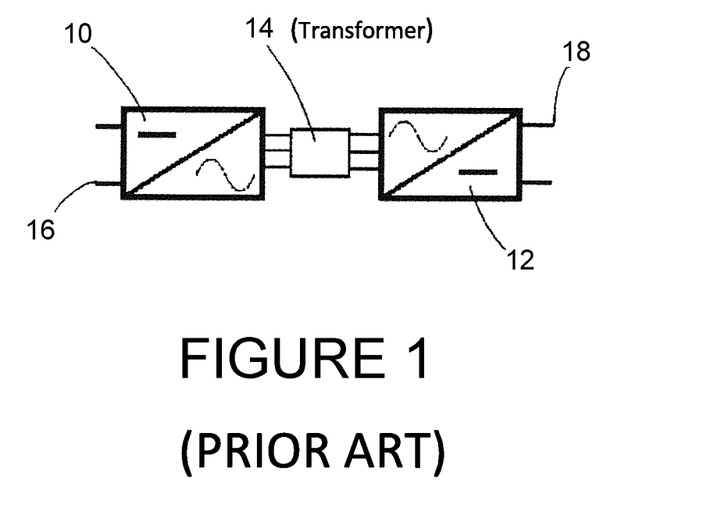
FIG. 1 shows a conventional DC to DC connection scheme.

Such transmission between high voltage DC networks can be achieved through the provision of first and second conventional voltage converters 10, 12 which are interconnected by a high power transformer 14, as shown in FIG. 1.

In a first mode of operation the first voltage converter 10 converts an incoming DC voltage from a first high voltage DC network 16 into an alternating voltage which the transformer 14 increases or decreases to allow conversion by the second voltage converter 12 to a desired outgoing DC voltage, as required in a second high voltage DC network 18.

In a second mode of operation the second voltage converter 12 converts an incoming DC voltage from the second high voltage DC network 18 into an alternating voltage which the transformer 14 increases or decreases to allow conversion by the first voltage converter 10 to a desired outgoing DC voltage, as required in the first high voltage DC network 16.

Such first and second conventional voltage converters 10, 12 provide a wide range of functionality and so are deployable in a large number of DC power transmission scenarios. However, they require two fully rated power electronic converters, i.e. conventional voltage converters 10, 12, and an intermediate transformer 14, meaning they tend to be large, heavy, and expensive.

There is, therefore, a need for a small, lightweight, inexpensive, and reliable means of connecting first and second high voltage DC power transmission networks.

According to an aspect of the invention there is provided a DC to DC converter assembly, for connecting first and second high voltage DC power transmission networks, comprising:

an inverter having first and second terminals connectable in use to a first high voltage DC power transmission network, the inverter being defined by a modular multilevel converter including a first inverter limb extending between the first and second terminals and having first and second inverter limb portions separated by a third terminal, each inverter limb portion including at least one rationalised module having first and second sets of series-connected current flow control elements connected in parallel with at least one energy storage device, each set of current flow control elements including an active switching element to selectively direct current through the energy storage device and a passive current check element to limit current flow through the rationalised module to a single direction, the current flow control elements and the or each energy storage device combining to selectively provide a voltage source to synthesise an AC voltage at the third terminal; and a rectifier electrically connected to the third terminal of the inverter by a first link and connectable in use to a second high voltage DC power transmission network, the rectifier being configured to convert the AC voltage conveyed by the first link into a second DC voltage for supply to the second high voltage DC power transmission network.

SUMMARY

The inclusion of a passive current check element in each set of current flow control elements reduces considerably the number of active elements, i.e. elements which are operable to change between different operating configurations, in the DC to DC converter assembly while allowing the remaining active switching element to continue selectively directing current through the or each corresponding energy storage device in order to provide the necessary voltage source to synthesise the AC voltage, and hence permit the transfer of power from the first high voltage DC power transmission network to the second high voltage DC power transmission network.

Such passive current check elements are lighter, smaller, and simpler than active elements, and hence less expensive and more reliable too. The resulting DC to DC converter assembly is therefore able to provide a small, lightweight, inexpensive, and reliable means of connecting the first and second high voltage DC power transmission networks.

Preferably the inverter includes a second inverter limb extending between the first and second terminals, the second inverter limb having third and fourth inverter limb portions separated by a fourth terminal electrically connected to the rectifier by a second link, each of the third and fourth inverter limb portions including at least one rationalised module or each of the third and fourth inverter limb portions including a voltage storage element.

Such an arrangement increases the flexibility with which the converter assembly is able to transfer power from the first high voltage DC power transmission network to the second high voltage DC power transmission network via the said first and second links.

The inclusion of at least one rationalised module in each of the third and fourth inverter limb portions provides for a wide range of differing ratios between the incoming first DC voltage and the outgoing second DC voltage, while the inclusion of a voltage storage element in each of the third and fourth inverter limb portions simplifies still further the component structure of the converter assembly leading to additional size, weight and cost savings.

Optionally the inverter includes a third inverter limb extending between the first and second terminals, the third inverter limb having fifth and sixth inverter limb portions separated by a fifth terminal electrically connected to the rectifier by a third link, each of the fifth and sixth inverter limb portions including at least one rationalised module or each of the fifth and sixth inverter limb portions including a voltage storage element.

Such an arrangement further increases the flexibility with which the converter assembly is able to transfer power from the first high voltage DC power transmission network to the second high voltage DC power transmission network via the said first, second and third links. For example, the inclusion of first, second and third inverter limbs allows the converter assembly of the invention to handle 3-phase power transmission.

The inclusion of at least one rationalised module in each of the fifth and sixth inverter limb portions provides for a wide range of differing ratios between the incoming first DC voltage and the outgoing second DC voltage, while the inclusion of a voltage storage element in each of the third and fourth inverter limb portions simplifies still further the component structure of the converter assembly leading to additional size, weight and cost savings.

The rectifier may include one or more rectifier limbs, the or each rectifier limb corresponding to a respective inverter limb and including corresponding rectifier limb portions, the rectifier limb portions in a respective rectifier limb including at least one rationalised module and/or a passive current check element.

The inclusion of one or more rectifier limbs provides desirable conversion of the AC voltage conveyed by a respective link into a desired level of second DC voltage for supply to the second high voltage DC power transmission network.

In addition, the inclusion of at least one rationalised module in one or more rectifier limbs allows the converter assembly to vary the magnitude ratio of an AC voltage conveyed by a respective link and the second DC voltage supplied to the second power transmission network, while the inclusion of a passive current check element in one or more rectifier limbs leads the given rectifier limb to have a simplified component structure.

In a preferred embodiment of the invention the or at least one rationalised module includes first and second sets of series-connected current flow control elements connected in parallel with the respective energy storage device in a full-bridge arrangement to define a 2-quadrant bipolar rationalised module that can provide zero, positive or negative voltage while conducting current in a single direction.

Such an arrangement allows the at least one module to contribute towards either a voltage magnitude increase or a voltage magnitude decrease across the inverter or rectifier in which it is located, while permitting the transfer of power from the first high voltage DC network to the second high voltage DC network.

Optionally the switching element in each set of current flow control elements includes an anti-parallel diode connected in parallel therewith.

Preferably each anti-parallel diode is configured to, in use, inhibit the flow of current through the inverter or rectifier in which it is located from the high voltage DC power transmission network the corresponding inverter or rectifier is in use connected with to the high voltage DC power transmission network in which a fault has occurred.

The inclusion of such anti-parallel diodes allows the converter assembly of the invention to handle a fault in one of the first or second high voltage DC power transmission networks and prevent its propagation to the other network. This is highly desirable because it allows the connection of two existing high voltage DC power networks without the need to increase the fault level in either network. As such, existing cables, transmission lines, and protection equipment can continue to be used without the need to upgrade their capability to accommodate an increased fault current that might otherwise flow from the newly connected network.

The or each link may electrically connect the rectifier directly with the corresponding terminal of the inverter.

Such an arrangement simplifies still further the component structure of the converter assembly, and so reduces further the size, weight, and cost of the converter assembly.

In a further preferred embodiment of the invention the or each link electrically connects the rectifier with the corresponding terminal of the inverter via a power transformer.

The inclusion of a power transformer within the or each link provides for a greater range of voltage magnitude ratios between the first and second DC voltages.

The inverter may include a controller configured to switch the or each switching element in the rationalised modules of at least one inverter limb at a high frequency to generate a high frequency AC voltage at the corresponding terminal lying between the inverter limb portions of the said at least one inverter limb.

The generation of a high frequency AC voltage at the terminal of the or each inverter limb provides the opportunity of reducing the size and weight of any power transformer lying within the or each corresponding link between the inverter and rectifier.

Optionally the inverter includes a controller configured to switch the or each switching element in the rationalised modules of at least one inverter limb at a low frequency to generate a low frequency AC voltage at the corresponding terminal lying between the inverter limb portions of the said at least one inverter limb.

Operating the AC voltage conveyed by the or each link between the inverter and rectifier allows the converter assembly to accommodate the use of a conventional high power transformer within the or each said link.

Preferably the inverter includes a controller configured to switch the inverter limb portions of at least one inverter limb into simultaneous conduction to divert a portion of current flowing within the inverter away from the corresponding link electrically connected with the said at least one inverter limb.

The ability to divert a portion of current flowing within the inverter away from one or more links means that it is possible also to vary the magnitude of current flowing through the or each said link, and hence the magnitude of current flowing from the inverter to the rectifier.

The combined ability to vary the magnitude of both the current and the voltage transmitted by the or each link from the inverter to the rectifier allows the converter assembly of the invention to maintain a power balance between the inverter and the rectifier, and so avoids the need to include a high power transformer between the inverter and rectifier. Such a converter assembly is, therefore, smaller, lighter and less expensive than a converter assembly including such a power transformer.

BRIEF DESCRIPTION OF THE DRAWINGS

There now follows a brief description of preferred embodiments of the invention, by way of non-limiting examples, with reference to the accompanying drawings in which.

DETAILED DESCRIPTION

Figure 2:
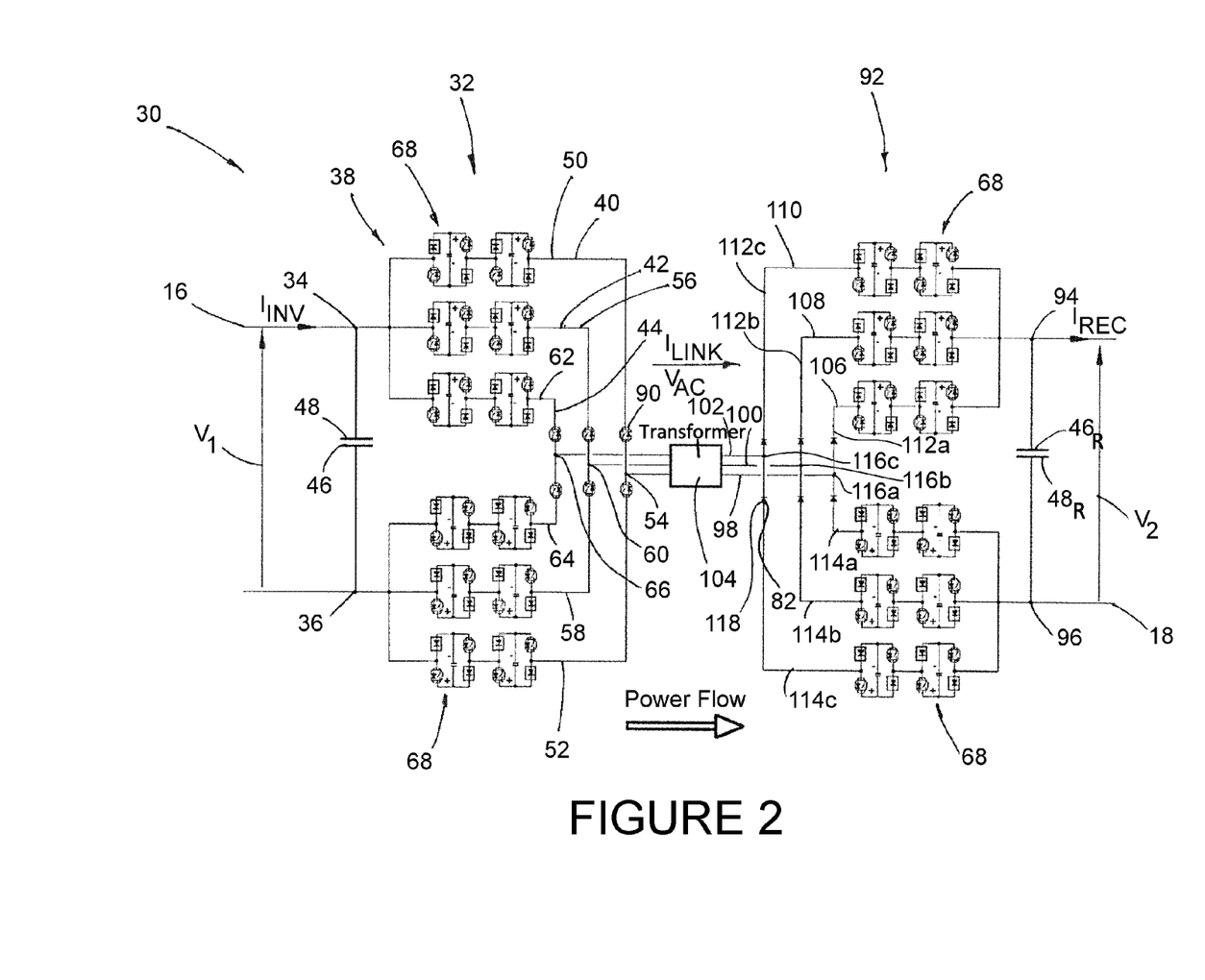
FIG. 2 shows a DC to DC converter assembly according to a first embodiment of the invention.

A DC to DC converter assembly according to a first embodiment of the invention is designated generally by the reference numeral 30, as shown in FIG. 2.

The DC to DC converter assembly includes an inverter 32 which has first and second terminals 34, 36 that are connectable in use to a first high voltage DC power transmission network 16.

The inverter 32 is defined by a modular multilevel converter 38 which, in the embodiment shown, includes first, second and third inverter limbs 40, 42, 44 each of which extends between the first and second terminals 34, 36. A first voltage storage device 46, e.g. a first capacitor 48, also extends between the first and second terminals 34, 36 to provide a path for alternating current ripple and to stabilise a first DC voltage $V_1$ from a first high voltage DC network 16 presented to the inverter 32.

The first inverter limb 40 includes first and second inverter limb portions 50, 52 that are separated by a third terminal 54, while the second inverter limb 42 includes third and fourth inverter limb portions 56, 58 separated by a fourth terminal 60, and the third inverter limb 44 includes fifth and sixth inverter limb portions 62, 64 which are separated by a fifth terminal 66.

Each inverter limb portion 50, 52, 56, 58, 62, 64 includes two rationalised modules 68 connected in series with one another. Other embodiments of the invention may include fewer than or, more preferably, greater than two rationalised modules in each inverter limb portion 50, 52, 56, 58, 62, 64.

Figure 3A:
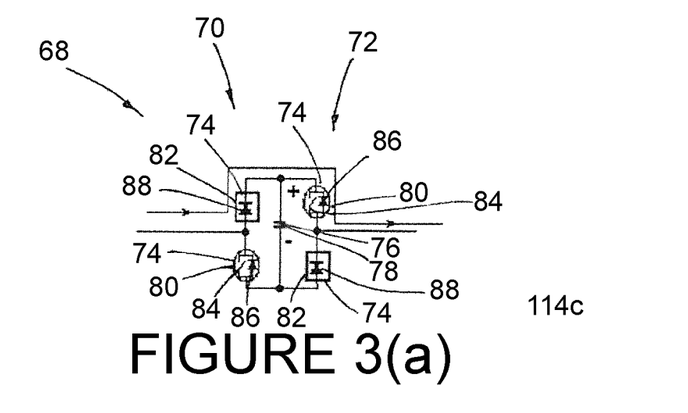
FIGS. 3(a) to (c) show a rationalised module which forms part of the DC to DC converter assembly shown in FIG. 2 in each of three operating configurations.
Figure 3B:
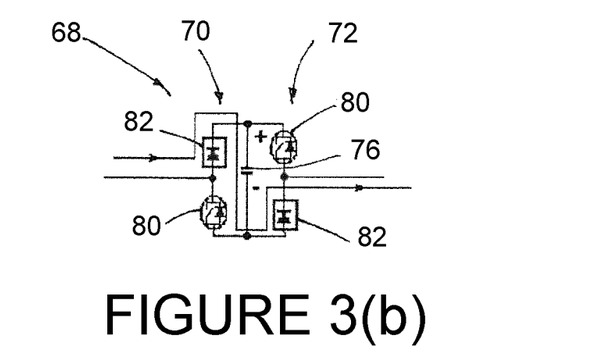
Figure 3C:
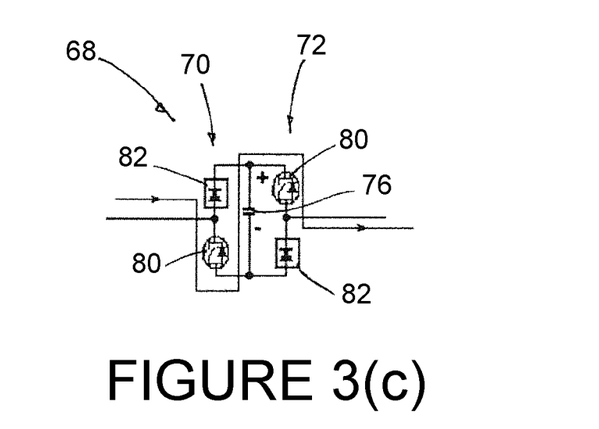

Referring to FIGS. 3(a)-3(c), each rationalised module 68 includes first and second sets 70, 72 of series-connected current flow control elements 74 that are connected in parallel with an energy storage device 76 in a full-bridge arrangement which defines a 2-quadrant bipolar rationalised module that can provide zero, positive and negative voltage.

In the embodiment shown the energy storage device 76 is a second capacitor 78 although other energy storage devices, such as fuel cells, photovoltaic cells, and batteries are also possible.

Each set 70, 72 of current flow control elements 74 includes a first active switching element 80 and a passive current check element 82, as shown more clearly in FIGS. 3(a) to 3(c).

The first active switching elements 80 selectively direct current through the energy storage device 76, i.e. the second capacitor 78, so as to provide a desired zero, positive or negative voltage, as illustrated schematically in FIGS. 3(a), 3(b), and 3(c) respectively. In the embodiment shown each first active switching element 80 is constituted by a semiconductor device in the form of an Insulated Gate Bipolar Transistor (IGBT) 84. Each first active switching element 80 also includes an anti-parallel diode 86 connected in parallel therewith.

In other embodiments of the invention (not shown) each first active switching element 80 may be a different semiconductor device such as a gate turn-off thyristor, a field effect transistor (FET), an insulated gate commutated thyristor, or an integrated gate commutated thyristor.

Meanwhile the passive current check elements 82 limit the current flow through the rationalised module 68 to a single direction, such that each rationalised module 68 conducts current in only one direction which, in the embodiment shown, is from the first high voltage DC power transmission network 16 to the respective third, fourth or fifth terminals 54, 60, 66. Each passive current check element 82 is a first diode 88.

Each inverter limb portion 50, 52, 56, 58, 62, 64 additionally includes a second active switching element 90 to selectively switch each inverter limb portion 50, 52, 56, 58, 62, 64 into circuit as needed for desired operation of the inverter 32.

The DC to DC converter assembly 30 also includes a rectifier 92 that has sixth and seventh terminals 94, 96 which are connectable in use to a second high voltage DC power transmission network 18.

The rectifier 92 is connected to each of the third, fourth, and fifth terminals 54, 60, 66 of the inverter 32 by respective first, second, and third links 98, 100, 102. Each link 98, 100, 102 interconnects the inverter 32 and the rectifier 92 via a high power transformer 104.

More particularly, the rectifier 92 includes first, second and third rectifier limbs 106, 108, 110 which correspond to the first, second and third inverter limbs 40, 42, 44, respectively. Each rectifier limb 106, 108, 110 includes first and second rectifier limb portions 112a, 114a, 112b, 114b, 112c, 114c which are separated by an eighth terminal 116a, 116b, 116c, and each eighth terminal 116a, 116b, 116c is connected by a corresponding first, second or third link 98, 100, 102 to the corresponding third, fourth and fifth terminal 54, 60, 66 of the inverter 32.

In the embodiment shown each rectifier limb portion 112a, 114a, 112b, 114b, 112c, 114c includes two series-connected rationalised modules 68 as described hereinabove. Other embodiments of the invention (not shown) may include fewer than or greater than two rationalised modules 68 in each rectifier limb portion 112a, 114a, 112b, 114b, 112c, 114c.

Each rectifier limb portion 112a, 114a, 112b, 114b, 112c, 114c also includes a passive current check element 82 in the form of a second diode 118 to provide a proportion of the off-state duty when the associated rectifier limb 106, 108, 110 is not conducting.

The rectifier 92 also includes a further voltage storage device $46_R$ in the form of a first capacitor $48_R$ connected between the sixth and seventh terminals 94, 96 to provide a path for alternating current ripple and to stabilise a second DC voltage $V_2$ of a second high voltage DC network 18.

The DC to DC converter assembly 30 also includes a controller (not shown) to switch the rationalised modules 68 at a desired high frequency, i.e. greater than 500 Hz, or a desired low frequency, e.g. around 50 to 60 Hz.

In use the converter assembly 30 functions as follows.

A first DC voltage $V_1$ is presented to the first and second terminals 34, 36 of the inverter 32 by the first high voltage DC power transmission network 16.

The inverter 32 selectively switches the 2-quadrant bipolar rationalised modules 68 in the first inverter limb 40 thereof to add and subtract voltage steps, i.e. "push up" and "pull down", the first DC voltage $V_1$ to synthesise a first alternating voltage phase component $V_{AC1}$ at the third terminal 54 of the inverter 32. The synthesised voltage phase component $V_{AC1}$ has a substantially sinusoidal waveform, although in other embodiments the shape of the waveform may be different, e.g. tending towards a square waveform.

In this manner the inverter 32 controls the ratio of the magnitude of the first DC voltage $V_1$ and the magnitude of the first alternating voltage phase component $V_{AC1}$, i.e. controls the magnitude ratio of the first DC voltage $V_1$ and the alternating voltage phase component $V_{AC1}$. In the foregoing manner the inverter 32 synthesises a first phase of an alternating voltage $V_{AC}$ which is conducted by the first link 98, via the high power transformer 104, from the inverter 32 to the rectifier 92.

In this regard it is noted that power is commonly transmitted in 3-phase networks by sinusoidal voltages and currents that are displaced by 120 electrical degrees. Each phase distributes power pulsating with a $2^{nd}$ harmonic component but when the three phases are combined, the sum is steady because the $2^{nd}$ harmonic components cancel.

In a similar manner to that mentioned above in relation to the first inverter limb 40, the inverter 32 switches the rationalised modules 68 in the second and third inverter limbs 42, 44 to synthesise respective alternating voltage phase components $V_{AC2}$, $V_{AC3}$ at the fourth and fifth terminals 60, 66 thereof.

The second and third links 100, 102 conduct the corresponding alternating voltage phase component $V_{AC2}$, $V_{AC3}$ to the rectifier 92 via the power transformer 104.

The magnitude of current transferred from the first high voltage DC power transmission network 16 to the second high voltage DC power transmission network 18, via the respective first, second and third links 98, 100, 102, varies in accordance with the transformer turns ratio.

The high power transformer 104 therefore acts to step up or step down the respective alternating voltage phase components $V_{AC1}$ $V_{AC2}$, $V_{AC3}$ generated at each of the third, fourth and fifth terminals 54, 60, 66, so as to maintain a balance in the power transferred from the first high voltage DC power transmission network 16 to the second high voltage DC power transmission network 18.

The rectifier 92 selectively switches the 2-quadrant bipolar rationalised modules 68 in the first, second and third rectifier limbs 106, 108, 110 thereof to add and subtract voltage steps from a second DC voltage $V_2$ of the second high voltage DC network 18 (which appears across the sixth and seventh terminals 94, 96 of the rectifier 92) to produce alternating voltage phase components $V_{AC1}$, $V_{AC2}$, $V_{AC3}$ that appear at a rectifier side, i.e. a high voltage side in the embodiment shown, of the power transformer 104.

A small phase angle difference is introduced between the alternating voltage components $V_{AC1}$, $V_{AC2}$, $V_{AC3}$ on the high voltage side of the power transformer 104 and the alternating voltage components $V_{AC1}$, $V_{AC2}$, $V_{AC3}$ on the inverter side, i.e. the low voltage side, of the power transformer 104 to cause power to flow from the inverter 32 to the rectifier 92.

The rationalised modules 68 of both the inverter 32 and the rectifier 92 can change the magnitude of the alternating voltage $V_{AC}$ on either side of the transformer 104 and so provide a further method of varying the ratio of first and second DC voltages $V_1$, $V_2$ between the first and second networks 16, 18.

In use the converter assembly 30 is able also to respond to and isolate a fault that may occur in either of the first or second high voltage DC power transmission networks 16, 18.

Figure 4:
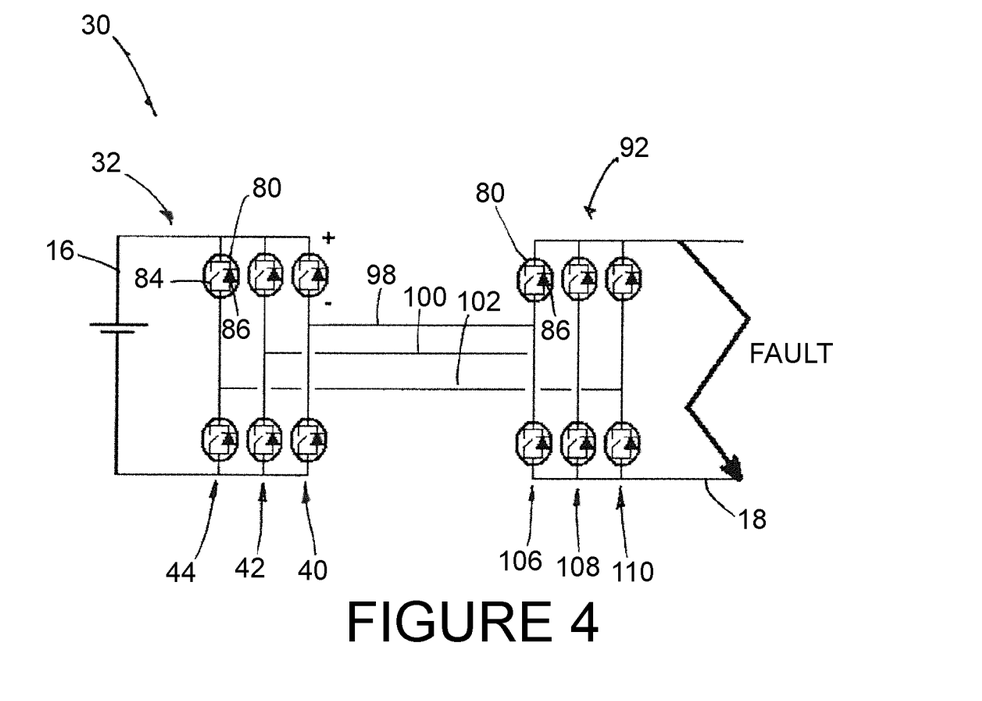
FIG. 4 illustrates the fault response of the converter assembly shown in FIG. 2.

For example, if a fault occurs in the second network 18, as illustrated schematically in FIG. 4, the voltage across each of the first, second and third links 98, 100, 102 between the inverter 32 and the rectifier 92 collapses to zero (i.e. there is a symmetrical 3-phase short circuit at the links 98, 100, 102 which is coupled through by the anti-parallel diodes 86 within the rectifier 92).

With collapsed links 98, 100, 102 the anti-parallel diodes 86 in the inverter 32 become reverse biased because the first DC voltage $V_1$ is higher than the (zero) alternating voltage $V_{AC}$ at the links 98, 100, 102.

As a result current cannot pass from the first network 16 to either the links 98, 100, 102 or the second network 18.

The converter assembly 30 therefore prevents the propagation of a fault from one DC network to another. The converter assembly 30 is able to provide such fault blocking even when the rationalised modules 68 in each of the inverter 32 and the rectifier 92 include half-bridge switching arrangements.

Figure 5:
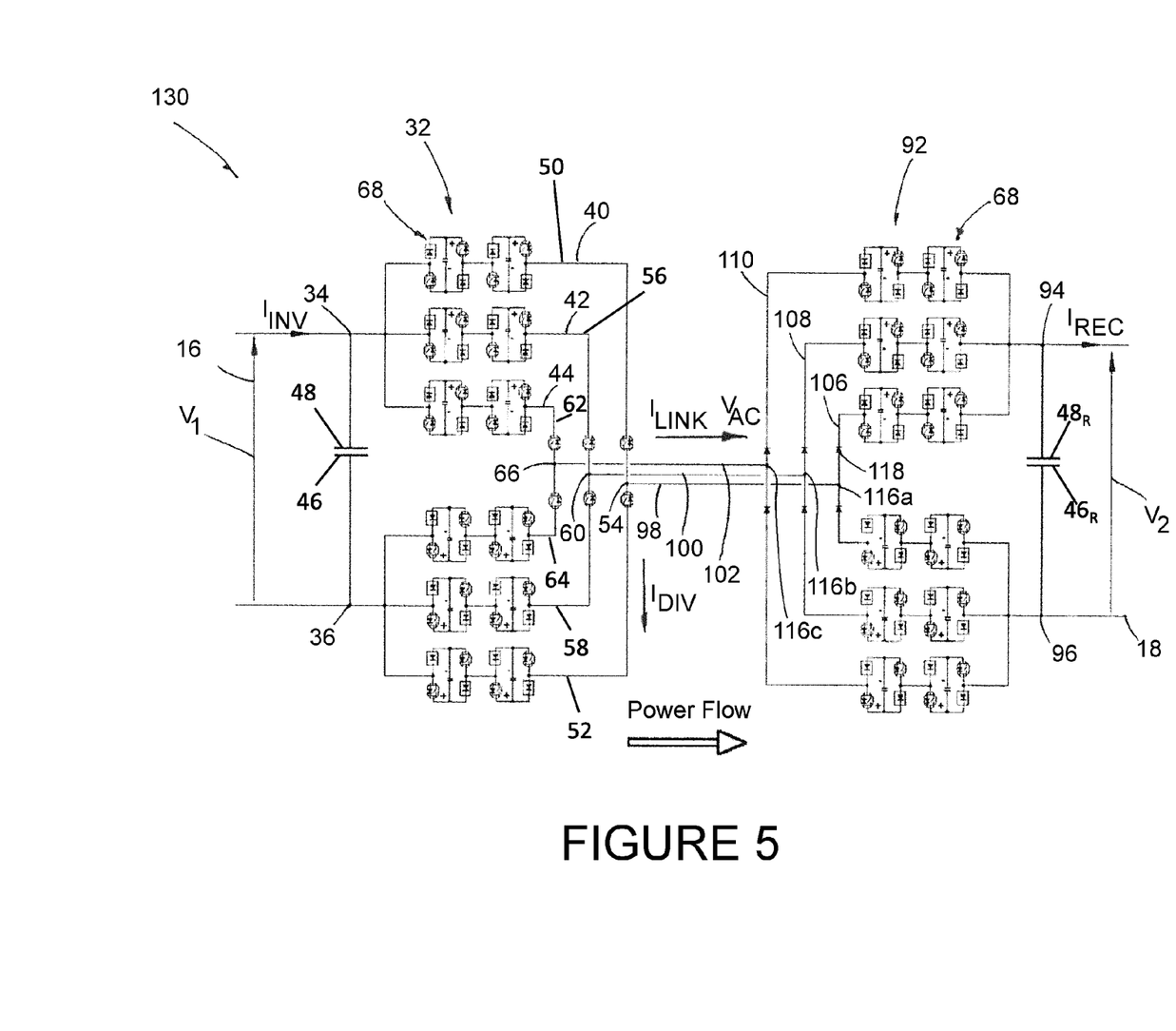
FIG. 5 shows a DC to DC converter assembly according to a second embodiment of the invention.

A DC to DC converter assembly 130 according to a second embodiment of the invention is shown in FIG. 5 and is similar to the first converter assembly 30 shown in FIG. 2. As such like features share the same reference numerals.

However, the second converter assembly 130 differs from the first converter assembly 30 in that each of the first, second and third links 98, 100, 102 electrically connects the rectifier 92 directly with the inverter 32, i.e. each of the third, fourth and fifth terminals 54, 60, 66 of the inverter 32 is connected directly to a corresponding eighth terminal 116a, 116b, 116c of the rectifier 92 by a respective first, second or third link 98, 100, 102.

In addition, the controller (not shown) associated with the inverter 32 in the second converter assembly 130 is configured to switch the respective inverter limb portions 50, 52, 56, 58, 62, 64 of each inverter limb 40, 42, 44 into simultaneous conduction to divert a portion of current $I_{INV}$ flowing within the inverter 32 away from the corresponding link 98, 100, 102 which is electrically connected to the given inverter limb 40, 42, 44.

In particular the controller is configured to:
(a) switch the first and second limb portions 50, 52 of the first inverter limb 40 of into simultaneous conduction to divert a current portion $I_{DIV1}$ of the current $I_{INV}$ flowing within the invereter 32 away from the first link 98, such that a current portion $I_{LINK1}$ flows through the first link 98 (where $I_{LINK1} < I_{INV}$);
(b) switch the third and fourth limb portions 56, 58 of the second inverter limb 42 into simultaneous conduction to divert a current portion $I_{DIV2}$ of the current $I_{INV}$ flowing within the inverter 32 away from the second link 100, such that a current portion $I_{LINK2}$ flows through the second link 100 (where $I_{LINK2} < I_{INV}$); and
(c) switch the fifth and sixth limb portions 62, 64 of the third converter limb 44 into simultaneous conduction to divert a current portion $I_{DIV3}$ of the current $I_{INV}$ flowing within the inverter 32 away from the third link 102, such that a current portion $I_{LINK3}$ flows through the first link 102 (where $I_{LINK3} < I_{INV}$).

The second converter assembly 130 functions in a similar manner to the first converter assembly 30 in terms of the inverter 32 adding and subtracting voltage steps to a first DC voltage $V_1$ to synthesise various alternating voltage phase components $V_{AC1}$, $V_{AC2}$, $V_{AC3}$ which are synthesised by the rectifier 92 into a second DC voltage $V_2$.

However, the second converter assembly 130 differs in that the controller switches the respective inverter limb portions 50, 52, 56, 58, 62, 64 in each inverter limb 40, 42, 44 into simultaneous conduction to divert a respective current portion $I_{DIV1}$, $I_{DIV2}$, $I_{DIV2}$, $I_{DIV3}$, of a first DC current $I_{INV}$ flowing around the inverter 32, away from the corresponding link 98, 100, 102, such that a reduced amount of current $I_{LINK1}$, $I_{LINK2}$, $I_{LINK3}$ flows through each link 98, 100, 102 to the rectifier.

Although not shown for reasons of clarity, each inverter limb portion 50, 52, 56, 58, 62, 64 may include an inductance to assist in controlling the diversion current $I_{DIV1}$, $I_{DIV2}$, $I_{DIV3}$ when the inverter limb portions 50, 52, 56, 58, 62, 64 are brought into simultaneous conduction.

An inductance may also be included in each of the first, second and third links 98, 100, 102 to facilitate control of the power flow from the inverter 32 to the rectifier 92.

The reduced amount of current $I_{LINK1}$, $I_{LINK2}$, $I_{LINK3}$ entering the rectifier 92 is synthesised by the rectifier 92 into a second DC current $I_{REC}$ which is lower than the first DC current $I_{INV}$.

The difference between the first and second DC currents $I_{INV}$, $I_{REC}$ allows the second converter assembly 130 to maintain a balance between the input power, i.e. $I_{INV} \times V_1$, and the output power, i.e. $I_{REC} \times V_2$, and so avoids the need for a high power transformer between the inverter 32 and rectifier 92, thus saving further size, weight and cost in the second converter assembly 130.

Figure 6:
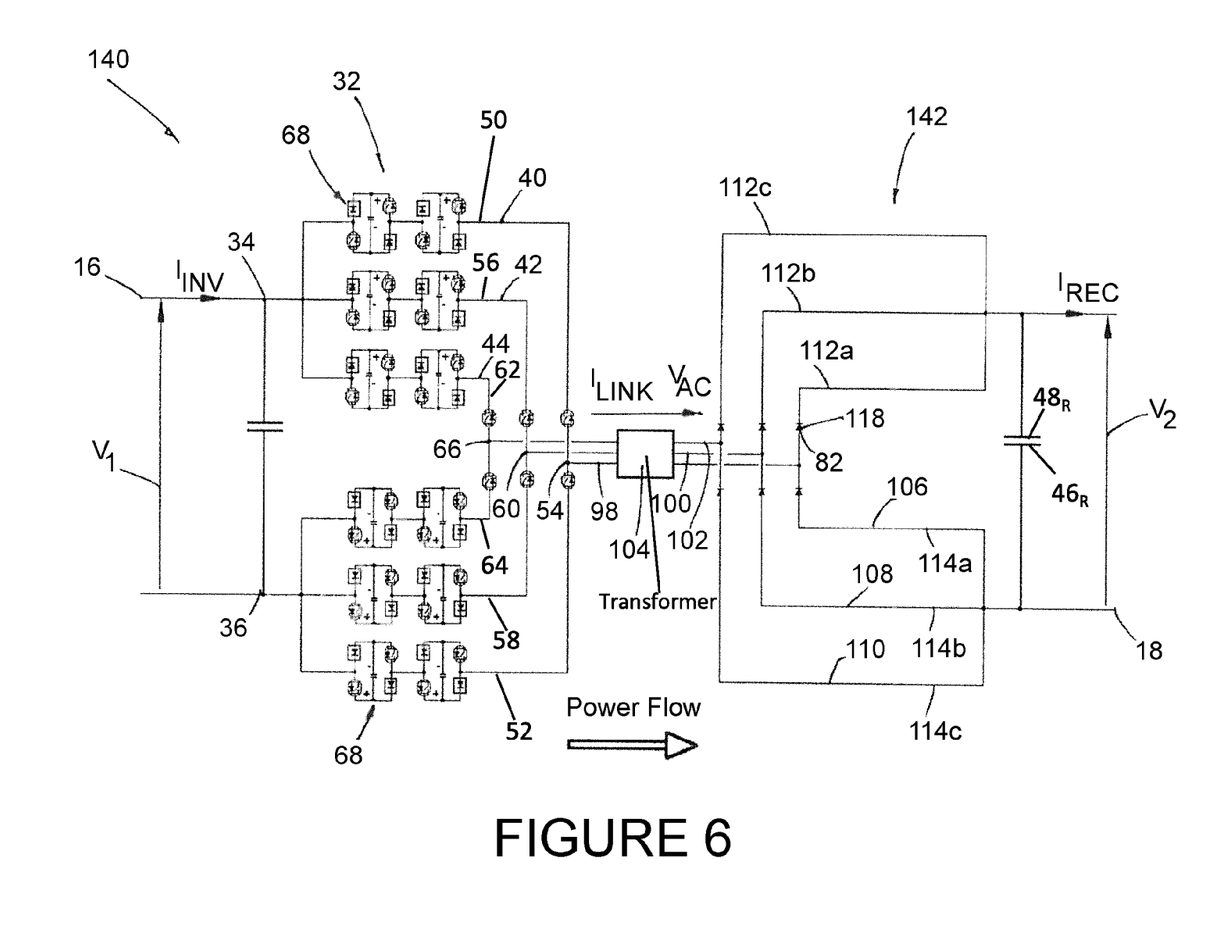
FIG. 6 shows a DC to DC converter assembly according to a third embodiment of the invention.

A DC to DC converter assembly 140 according to a third embodiment of the invention is illustrated schematically in FIG. 6.

The third DC to DC converter assembly 140 is similar to the first DC to DC converter assembly 30 and like features share the same reference numerals. In particular the inverter 32 in the third DC to DC converter is identical to the inverter 32 of the first converter assembly 30.

However, the third converter assembly 140 includes a second rectifier 142 which differs from the rectifier 92 in the first converter assembly 30.

More particularly, each of the rectifier limb portions 112a, 114a, 112b, 114b, 112c, 114c in the rectifier limbs 106, 108, 110 of the second rectifier 142 includes only a passive current check element 82 in the form of a second diode 118, i.e. each rectifier limb portion 112a, 114a, 112b, 114b, 112c, 114c omits a rationalised module 68. Such an arrangement saves further size, weight and cost in the third converter assembly 140.

In use the inverter 32 and high power transformer 104 of the third converter assembly 140 function in essentially the same manner as in the first converter assembly 30.

The second diodes 118 in the second rectifier 142 are configured as a standard three-phase diode rectifier without the alternating voltage wave-shaping functionality provided by the rationalised modules 68 included in the inverter 32. In this manner, the second rectifier 142 converts alternating voltage $V_{AC}$ at the transformer 104 into a second DC voltage $V_2$.

During such operation the respective alternating current $I_{LINK}$ and direct current $I_{REC}$ on either side of the transformer 104 will contain some harmonic distortion but this is normal with such simple rectifier arrangements and perfectly acceptable for many power transmission applications, particularly if the alternating voltage $V_{AC}$ is high frequency (e.g. 500 Hz).

Figure 7:
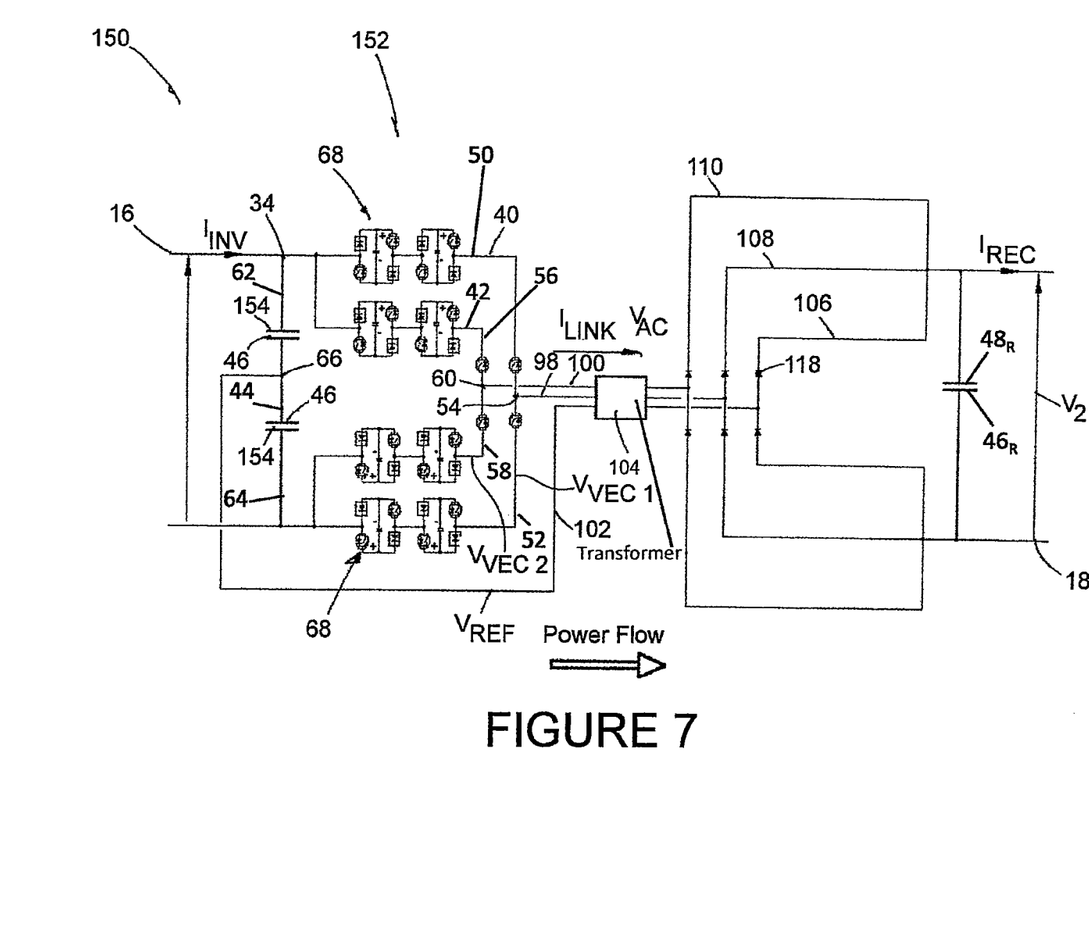
FIG. 7 shows a DC to DC converter assembly according to a fourth embodiment of the invention.

A DC to DC converter assembly according to a fourth embodiment of the invention is designated generally by the reference numeral 150, as shown in FIG. 7.

The fourth converter assembly 150 is similar to the third converter assembly 140 and like features are identified with the same reference numerals.

The fourth converter assembly 150 includes a second inverter 152 which differs from the first inverter 32 in each of the aforementioned converter assemblies 30; 130; 140.

The second inverter 152 includes first and second inverter limbs 40, 42 which are configured with inverter limb portions 50, 52, 56, 58 and rationalised modules 68 as described hereinabove in relation to the first, second and third converter assemblies 30; 130; 140.

The third inverter limb 44 of the second inverter 152 differs however in that each of the fifth and sixth inverter limb portions 62, 64 includes a voltage storage device 46 in the form of a passive third capacitor 154.

In use, the second inverter 152 operates a two-phase switching regime to form a balanced three-phase alternating voltage $V_{AC}$ from two active voltage sources provided by the first and second inverter limbs 40, 42, and a third reference voltage.

In particular, each of the first and second inverter limbs 40, 42 of the second inverter 152 operate in the same manner as described above to synthesise a respective alternating voltage phase component $V_{AC1}$, $V_{AC2}$ at the third and fourth terminals 54, 60 thereof.

Meanwhile the fifth terminal 66 lying between respective passive third capacitors 154 is at a reference voltage potential $V_{REF}$, e.g. zero volts. Indeed, in some other embodiments of the invention the fifth terminal 66 may be connected to earth.

Figure 8A:
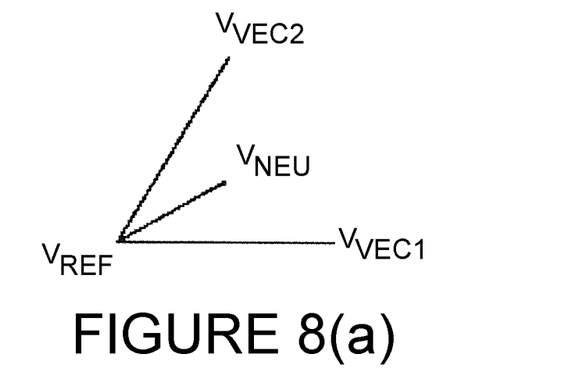
FIGS. 8(a) and 8(b) illustrate the functioning of the DC to DC converter shown in FIG. 7.

The second inverter 152 produces first and second voltage vectors $V_{VEC1}$, $V_{VEC2}$ relative to the reference voltage $V_{REF}$ that are 60° apart, as illustrated schematically in FIG. 8(a).

Figure 8B:
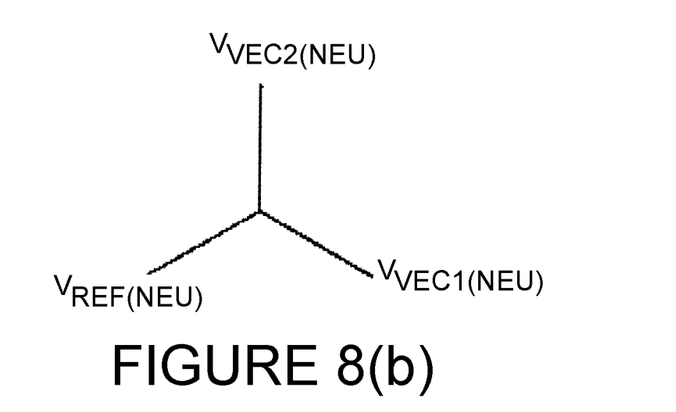

The voltage between each of the first, second and third links 98, 100, 102 is, however, of equal magnitude and 120 electrical degrees apart, as shown in FIG. 8(b). This is because the transformer is, for example, one having a star connected primary winding fed by $V_{VEC1}$, $V_{VEC2}$ and $V_{REF}$ and a neutral point experiencing a neutral voltage $V_{NEU}$.

Figure 9:
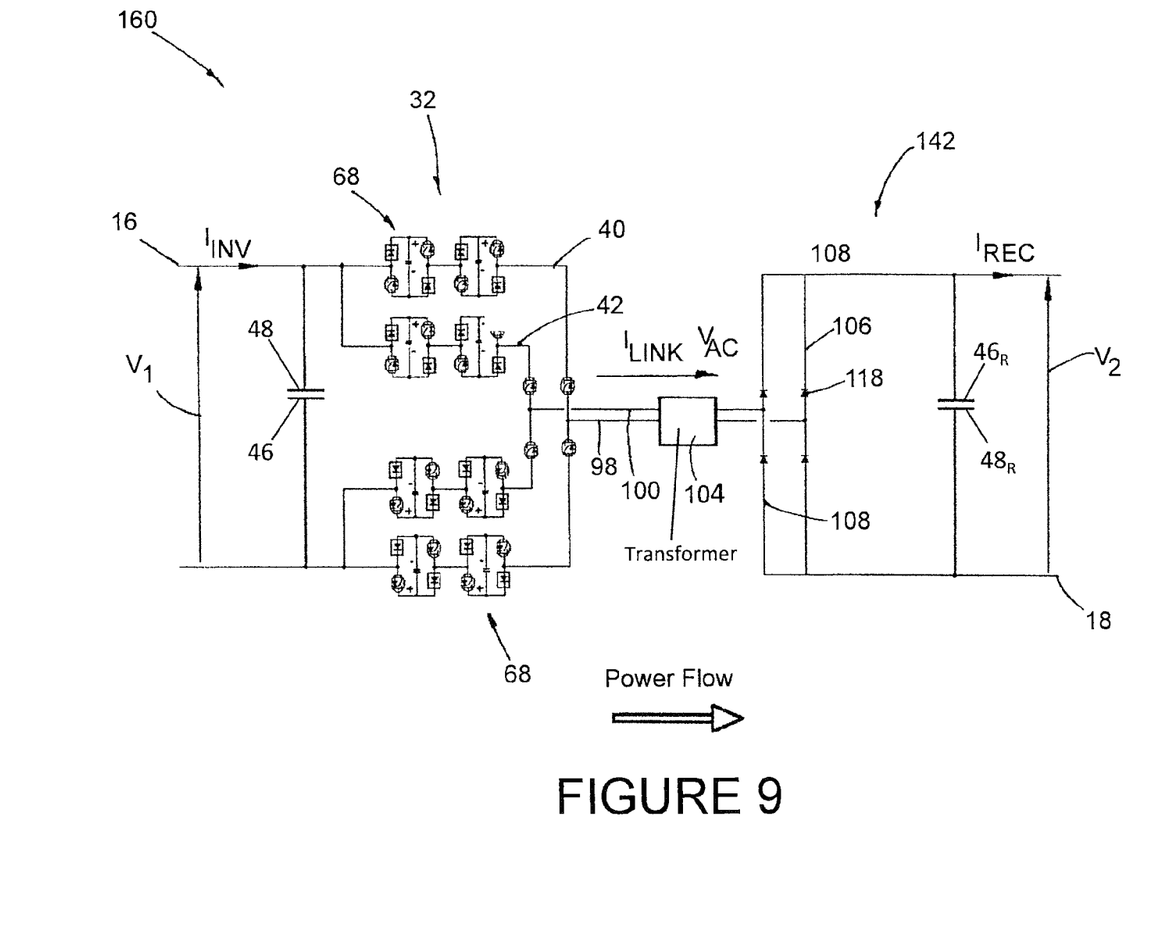
FIG. 9 shows a DC to DC converter assembly according to a fifth embodiment of the invention.

FIG. 9 shows a DC to DC converter assembly 160 according to a fifth embodiment of the invention.

The fifth converter assembly 160 is similar to the third converter assembly 140 shown in FIG. 6 but differs in that the inverter 32 includes only first and second inverter limbs 40, 42 and the second rectifier 142 includes only first and second rectifier limbs 106, 108. In a similar manner the fifth converter assembly 160 includes only first and second links 98, 100 between the said inverter 32 and rectifier 142.

As such the fifth converter assembly 160 functions in exactly the same manner as the third converter assembly 140 except that it handles only first and second alternating voltage phase components $V_{AC1}$, $V_{AC2}$.

Figure 10:
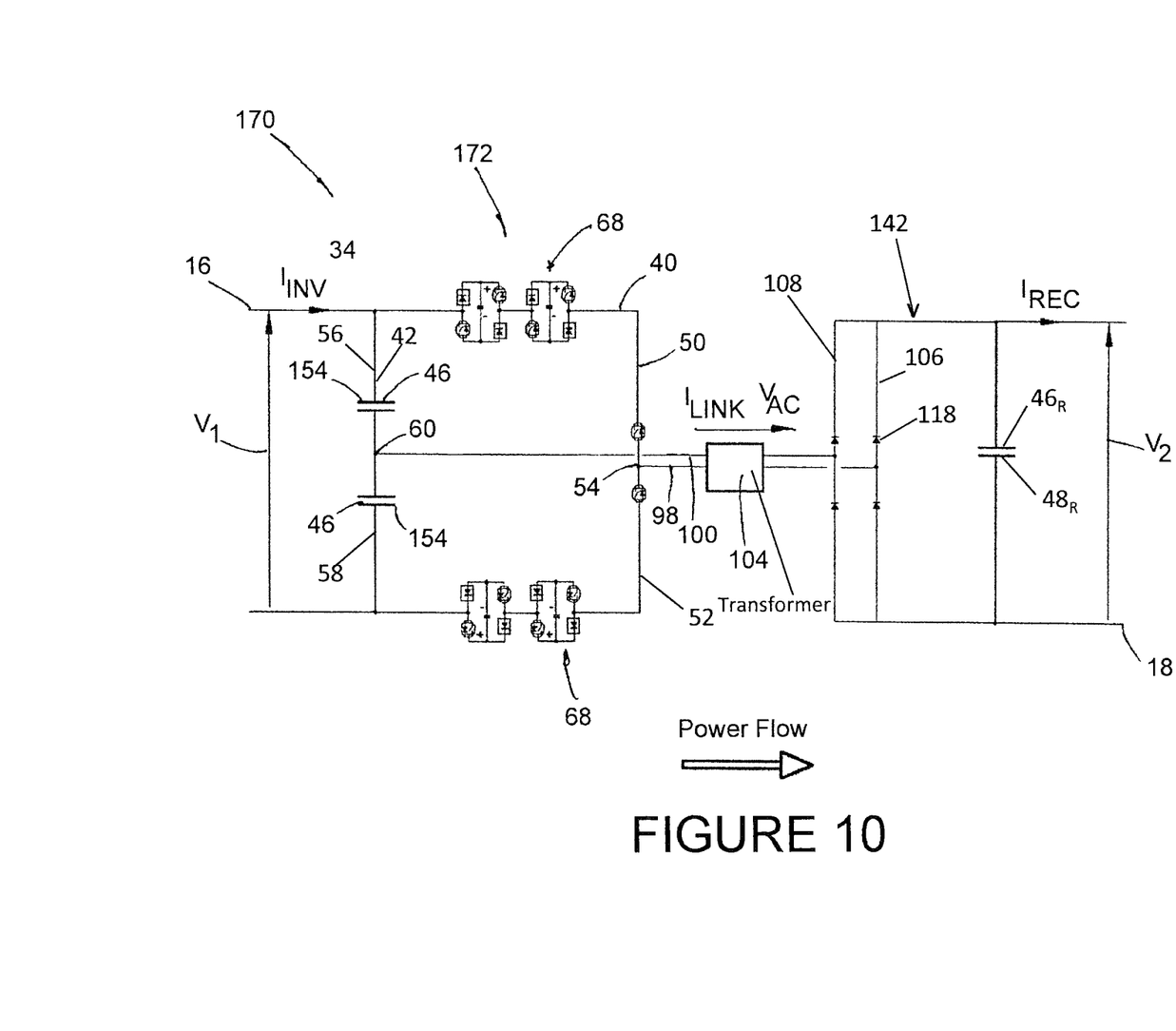
FIG. 10 shows a DC to DC converter assembly according to a sixth embodiment of the invention.

A further DC to DC converter assembly 170 according to a sixth embodiment of the invention is shown in FIG. 10.

The sixth converter assembly 170 is similar to the fifth converter assembly 160 in that each of a third inverter 172 and the second rectifier 142 include only first and second limbs 40, 42, 106, 108.

The third inverter 172 is similar to the second inverter 152 of the fourth converter assembly 150. In particular the third inverter 172 includes a first inverter limb 40 which is configured with inverter limb portions 50, 52 and rationalised modules 68 as described hereinabove.

The second inverter limb 42 of the third inverter 172 differs however in that each of the third and fourth inverter limb portions 56, 58 includes a voltage storage device 46 in the form of a passive third capacitor 154.

In use, the first inverter limb 40 of the third inverter 172 operates in the same manner as described above to synthesise an alternating voltage phase component $V_{AC1}$, at the third terminal 54 thereof.

The passive third capacitors 154 in the second inverter limb 42 provide a reference voltage point, e.g. zero voltage, to the transformer 104 via the second link 100. The first link 98 experiences a positive voltage when the rationalised modules 68 in the first inverter limb portion 50 are switched into circuit. Similarly the first link 98 experiences a negative voltage when the rationalised modules 68 in the second inverter limb portion 52 are switched into circuit.

The transformer 104 therefore experiences an alternating bidirectional voltage waveform $V_{AC}$ between the first and second links 98, 100. For practical high power applications, a large number of rationalised modules 68 in the first inverter limb 40 means the transformer voltage 104 can follow sinusoidal or, if preferred, more complex waveforms.

The second diodes 118 in the second rectifier 142 are configured as a standard single-phase diode rectifier without the alternating voltage wave-shaping functionality provided by the rationalised modules 68 included in the second inverter 172. In this manner the second rectifier 142 converts the alternating voltage $V_{AC}$ at the transformer 104 into a second DC voltage $V_2$ with the current on the AC and DC sides for the second rectifier 142 again containing some harmonic distortion, as is normal with such simple rectifier arrangements.

The invention claimed is:

1. A DC to DC converter assembly, for connecting first and second high voltage DC power transmission networks, comprising:
   an inverter having first and second terminals connectable in use to a first high voltage DC power transmission network, the inverter being defined by a modular multilevel converter including a first inverter limb extending between the first and second terminals and having first and second inverter limb portions separated by a third terminal, each inverter limb portion including at least one rationalised module having first and second sets of series-connected current flow control elements connected in parallel with at least one energy storage device in a full-bridge arrangement so as to define a 2-quadrant bipolar rationalised module that can provide zero, positive or negative voltage while conducting current in a single direction from the first high voltage DC network to the second high voltage DC network, each set of current flow control elements including an active switching element to selectively direct current through the energy storage device and a passive current check element to limit current flow through the rationalised module to a single direction, the current flow control elements and the or each energy storage device combining to selectively provide a voltage source to synthesise an AC voltage at the third terminal; and
   a rectifier electrically connected to the third terminal of the inverter by a first direct electrical link and connectable in use to a second high voltage DC power transmission network, the rectifier being configured to convert the AC voltage conveyed by the first direct electrical link into a second DC voltage for supply to the second high voltage DC power transmission network,
   wherein the DC to DC converter assembly is configured to transfer power from the first high voltage DC power transmission network to the second high voltage DC power transmission network, the first high voltage DC power transmission network having a different voltage than the second high voltage DC power transmission network.

2. The DC to DC converter assembly according to claim 1 wherein the inverter includes a second inverter limb extending between the first and second terminals, the second inverter limb having third and fourth inverter limb portions separated by a fourth terminal electrically connected to the rectifier by a second direct electrical link, each of the third and fourth inverter limb portions including at least one rationalised module or each of the third and fourth inverter limb portions including a voltage storage element.

3. The DC to DC converter assembly according to claim 2 wherein the inverter includes a third inverter limb extending between the first and second terminals, the third inverter limb having fifth and sixth inverter limb portions separated by a fifth terminal electrically connected to the rectifier by a third direct electrical link, each of the fifth and sixth inverter limb portions including at least one rationalised module or each of the fifth and sixth inverter limb portions including a voltage storage element.

4. The DC to DC converter assembly according to claim 1 wherein the rectifier includes one or more rectifier limbs, the or each rectifier limb corresponding to a respective inverter limb and including corresponding rectifier limb portions, the rectifier limb portions in a respective rectifier limb including at least one rationalised module and/or a passive current check element.

5. The DC to DC converter assembly according to claim 1 wherein the active switching element in each set of current flow control elements includes an anti-parallel diode connected in parallel therewith.

6. The DC to DC converter assembly according to claim 5 wherein each anti-parallel diode is configured to, in use, inhibit the flow of current through the inverter or rectifier in which it is located from the high voltage DC power transmission network the corresponding inverter or rectifier is in use connected with to the high voltage DC power transmission network in which a fault has occurred.

7. The DC to DC converter assembly according to claim 1 wherein the inverter includes a controller configured to switch the or each switching element in the rationalised modules of at least one inverter limb at a frequency to generate an AC voltage at the corresponding terminal lying between the inverter limb portions of the said at least one inverter limb.

8. The DC to DC converter assembly according to claim 1 wherein the inverter includes a controller configured to switch the inverter limb portions of at least one inverter limb into simultaneous conduction to divert a portion of current flowing within the inverter away from the corresponding link electrically connected with the said at least one inverter limb.

* * * * *